T. R. BRUMFIELD.
WIRE DIPPING MACHINE.
APPLICATION FILED MAY 24, 1918.

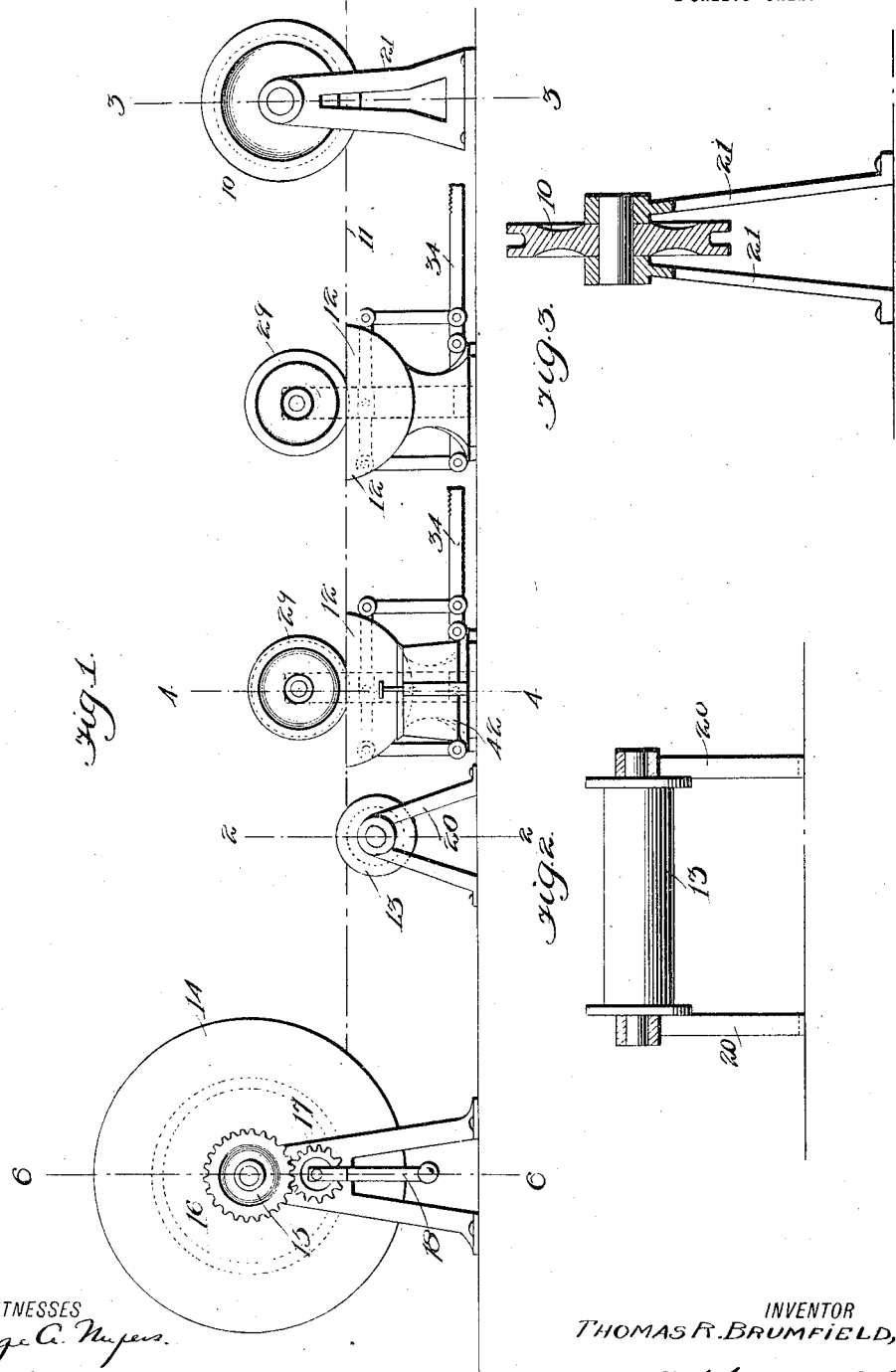

1,289,379.

Patented Dec. 31, 1918.
2 SHEETS—SHEET 2.

WITNESSES
Geo. C. Myers
Myron F. Clear

INVENTOR
THOMAS R. BRUMFIELD
BY
ATTORNEYS

UNITED STATES PATENT OFFICE.

THOMAS R. BRUMFIELD, OF DANVILLE, VIRGINIA.

WIRE-DIPPING MACHINE.

1,289,379. Specification of Letters Patent. Patented Dec. 31, 1918.

Application filed May 24, 1918. Serial No. 236,417.

*To all whom it may concern:*

Be it known that I, THOMAS R. BRUMFIELD, a citizen of the United States, and a resident of Danville, in the county of Pittsylvania and State of Virginia, have made certain new and useful Improvements in Wire-Dipping Machines, of which the following is a specification.

My present invention relates generally to apparatus for soldering joints in wires of any suitable type, and particularly to a wire dipping machine utilized in such apparatus, both for the purpose of cleaning and soldering the joints.

In the accompanying drawing in which I have illustrated the apparatus, in a general way, and more particularly showing machines constituting the present invention:—

Figure 4:
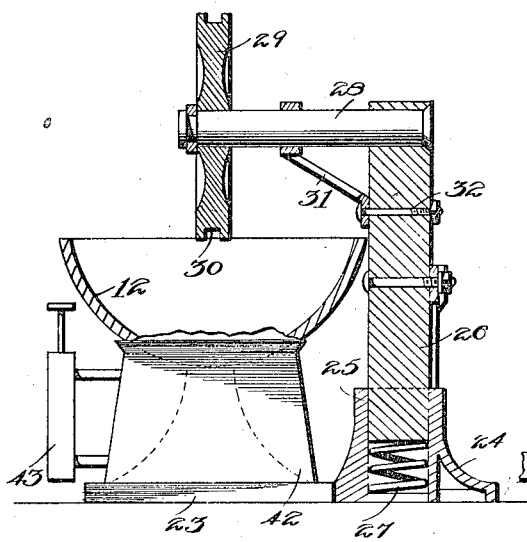
Figure 5:
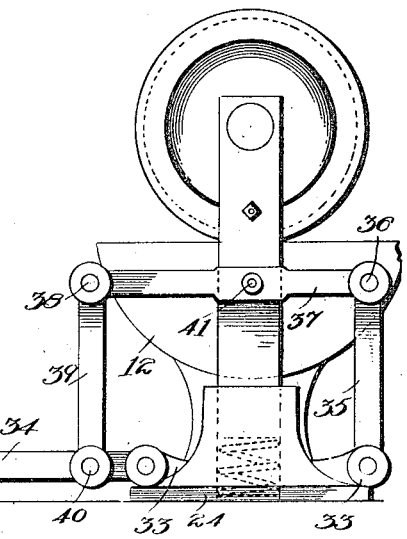
Figure 6:
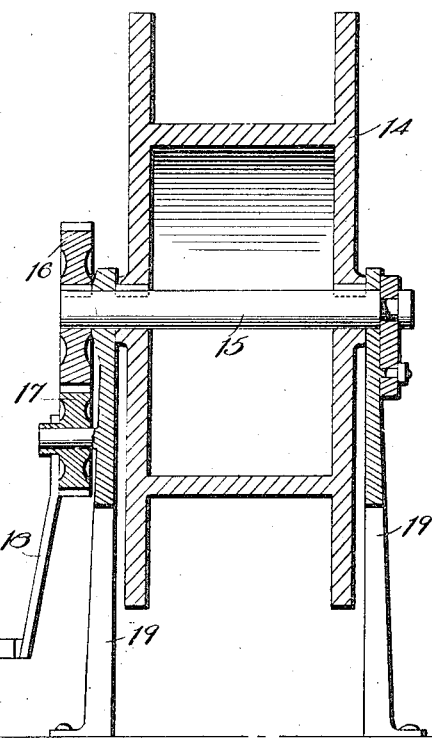

Figure 1 is a side view of the apparatus;

Figs. 2, 3 and 4 are vertical transverse sections taken respectively on line 2—2, 3—3 and 4—4 of Fig. 1;

Fig. 5 is a side view of the dipping machine, looking at the opposite side with respect to Fig. 1; and Fig. 6 is a vertical transverse section taken on line 6—6 of Fig. 1.

Referring now to these figures, and particularly to Fig. 1, my invention has to do with an apparatus wherein a jointed wire is passed beneath a bearing roller 10, the wire being indicated by the broken line 11, and passing over the fluid holding bowls 12, of a pair of dipping machines, which successively act upon the joints of the wire. From the dipping machines the wire passes over a bearing roller 13 and on to and around the drum 14 of a winding arrangement, the shaft 15 of which drum has a gear 16 engaged by a gear 17 of a crank 18 at one side of its frame 19, as seen both in Fig. 1 and the detail in Fig. 6.

The bearing roller 13 is mounted in a frame consisting of side uprights 20, as seen in Fig. 2, and the bearing roller 10 first above mentioned is somewhat similarly mounted in a frame consisting of side uprights, as seen in Fig. 3.

The present invention, however, particularly resides in the two dipping machines between the bearing rollers 10 and 13, each of which is identical in its main structure, the fluid holding bowl 12 of each being mounted upon a base 23, laterally extended at one side as at 24, and provided in said lateral extension with a vertical tubular bearing 25, for the lower end of a vertically adjustable upright support 26, the latter normally held in its uppermost position by means of a spring 27 in the lower portion of the bearing 25, upon which the lower end of the said upright is seated.

The upper end of the upright 26 supports one end of a laterally projecting horizontal shaft 28 at the outer end of which is a bearing roller 29 having an annular groove 30 in its periphery for wire guiding purposes, the said roller being disposed substantially above the center of the fluid holding bowl 12 so as to normally permit of the extension of the wire 11 across the upper end of the bowl, and move the joint of the wire downwardly into the fluid of the bowl when the upright 26 is forced in a downwardly direction against the tension of spring 27. The shaft 28 is additionally supported by an angular bracket 31 in one end of which the shaft has bearing, the opposite end of the bracket being bolted as at 32 to the upright.

The base 23 is also provided with laterally projecting lugs 33 at opposite sides of the extension 24, and as seen in Fig. 4. One of these lugs is pivoted to the inner end of a treadle or foot lever 34 and to the other lug is pivoted the lower end of an upwardly extending link 35, the latter pivotally connected at its upper end at 36 to one end of a lever 37 pivoted at its opposite end at 38 to the upper end of a link 39, the lower end of the latter of which is pivotally connected at 40 to the said foot lever or treadle 34 intermediate the ends of the latter.

The lever 37 has a fulcrum at 41 upon the upright 26 and thus when the outer free end of the foot lever or treadle 34 is depressed, the link 39 will pull one end of the lever 37 downwardly on the pivot 36, link 35 yielding to compensate for the arc of movement. This will obviously result in lowering movement of the upright 26 against the tension of spring 27, and will force the pulley 29 downwardly so as to press the wire beneath the same within the fluid held by the bowl 20.

By again referring to Fig. 1, as well as comparing Figs. 4 and 5, it will be noted that the dipping machine nearest the reel 14 has a lower casing 42, which may inclose any suitable form of heater having an external air pump 43, in order to maintain the soldering fluid in a molten state, which is of course necessary.

In operation, the wire, after the joints are twisted or otherwise made, is drawn by rotation of the reel, until the initial joint to be acted upon is beneath the roller 29 on the first dipping machine. The treadle 34 is then depressed so as to force the wire joint downwardly into the cleaning fluid, preferably in the form of an acid which will thoroughly clean the twisted wire in preparation for the soldering. The treadle 34 is then released and the reel again turned to bring the joint beneath the roller 29 of the second dipping machine, the bowl 12 of which holds the solder. Upon depressing the treadle 34 thereof, the same operation is repeated and the joint of the wire is forced downwardly into the soldering fluid and collects sufficient solder to firmly bind the twisted or otherwise connected wire ends and form a strong union and a permanent bond.

I claim:—

1. A wire dipping machine comprising a base having an upwardly opening horizontally disposed fluid holding bowl and provided with an extension at one end of the bowl having a vertical bearing, a vertically adjustable upright, the lower end of which is movable in said bearing, a spring disposed within the bearing, and on which the lower end of the upright is seated, a horizontal shaft journaled through the upper end of the upright and projecting laterally therefrom, a grooved wire guiding roller supported on the shaft above the center of the bowl and shiftable vertically into and out of the bowl with the vertical movement of the upright, a lever having a fulcrum upon the upright, an actuating lever pivoted to the base, and links pivoted to the opposite ends of the first named lever, one of said links being also pivoted to the actuating lever and the other link being pivoted to the base.

2. A wire dipping machine comprising a base having an upwardly opening horizontally disposed fluid holding bowl and provided with an extension at one end of the bowl having a vertical bearing, a vertically adjustable upright, the lower end of which is movable in said bearing, a spring disposed within the bearing, and on which the lower end of the upright is seated, a horizontal shaft journaled through the upper end of the upright and projecting laterally therefrom, a grooved wire guiding roller supported on the shaft above the center of the bowl and shiftable vertically into and out of the bowl with the vertical movement of the upright, and an actuating lever pivoted on the base and having operative connection with the upright for adjusting the latter vertically, as described.

3. A wire dipping machine including a horizontally disposed upwardly opening fluid holding bowl, a base on which the bowl is mounted, having a lateral extension provided with a vertical bearing, a spring supported upright having its lower end mounted in said bearing, a laterally projecting shaft journaled through the upper end of the upright, a grooved wire guiding roller mounted on the shaft above the center of the bowl and movable vertically into and out of the bowl with the movement of the upright, an actuating lever pivoted to the extension of the base, and operative connections between the said lever and the upright for moving the latter vertically.

4. A wire dipping machine comprising a horizontally disposed upwardly opening fluid holding bowl, an upright movable vertically at one side of the bowl, a shaft projecting laterally from the upper portion of the upright above the bowl, a wire guiding roller carried by the shaft above the center of the bowl and movable vertically into and out of the latter with the movements of the upright, a spring normally holding the upright in its upper position, and a lever having operative connections with the upright for moving the same downwardly to force the guide roller into the bowl.

5. A wire dipping machine comprising a horizontally disposed upwardly opening fluid holding bowl, a vertically movable upright at one side of the bowl, a roller disposed above the center of the bowl and having a support carried by and movable with the upright, spring means engaging the upright to normally hold the roller above the bowl and means for moving the said upright downwardly against the tension of said spring whereby to force the roller into the fluid holding bowl, substantially as described.

THOMAS R. BRUMFIELD.

Copies of this patent may be obtained for five cents each, by addressing the "Commissioner of Patents Washington, D. C."